Figure 1:
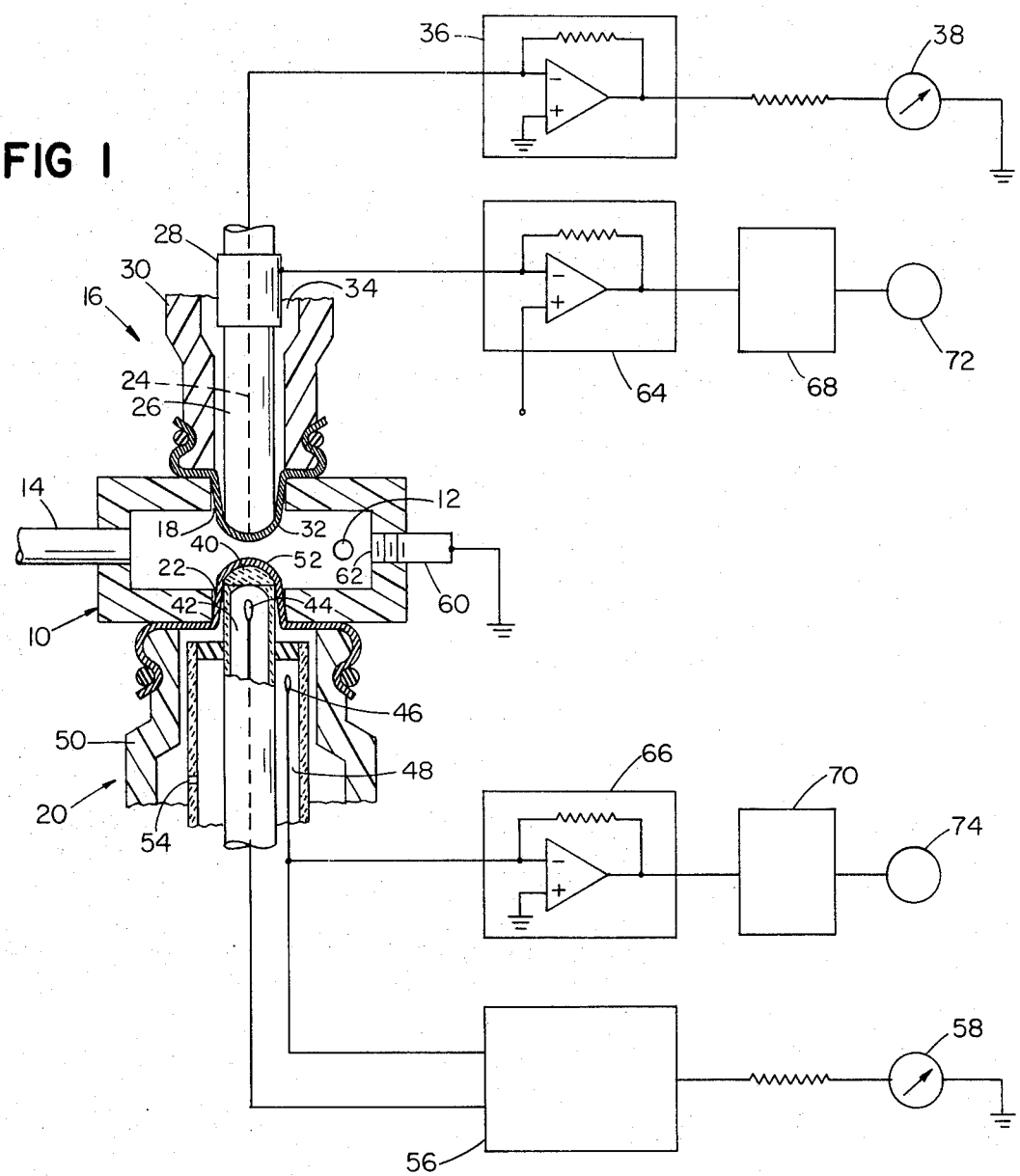

United States Patent [19]
Neuwelt

[11] 3,718,568
[45] Feb. 27, 1973

[54] ELECTROCHEMICAL SENSOR INSTRUMENTATION

[75] Inventor: Robert T. Neuwelt, Arlington, Mass.

[73] Assignee: Instrumentation Laboratory, Inc., Lexington, Mass.

[22] Filed: May 21, 1971

[21] Appl. No.: 145,839

[52] U.S. Cl. ................. 204/195 P, 204/1 T, 324/29, 324/51
[51] Int. Cl. ....................... G01n 27/30, G01n 27/40
[58] Field of Search ...204/195 P, 195 M, 195 L, 1 T; 324/51, 29

[56] References Cited

UNITED STATES PATENTS 2,913,386   11/1959   Clark .............................. 204/195 P
3,661,748   5/1972   Blackmer ......................... 204/195 P

*Primary Examiner*—G. L. Kaplan
*Attorney*—Willis M. Ertman

[57] ABSTRACT

Apparatus for monitoring the integrity of a selectively permeable membrane in an electrochemical sensor system that includes two half cells, a monitoring electrode having a surface disposed in the sample chamber, and a monitoring circuit connected to a half cell on the opposite side of the selectively permeable membrane from the monitoring electrode for sensing current flow resulting from the difference in electric potential at the monitoring electrode and the galvanic potential genereated by the connected half cell for providing an output signal to indicate the integrity of the selectively permeable membrane.

17 Claims, 2 Drawing Figures

PATENTED FEB 27 1973 3,718,568

ELECTROCHEMICAL SENSOR INSTRUMENTATION

SUMMARY OF INVENTION

This invention relates to electrochemical sensor instrumentation and more particularly to instrumentation of that type which include means for separating electrochemical sensor components from the sample to be analyzed.

The use of electrochemical sensor instrumentation to measure the amount of dissolved gases has become increasingly widely used in recent years. A membrane is frequently employed in such sensors to separate sensor components from the fluid under analysis to prevent undesirable interference in the sensor operation. An example of such an electrochemical sensor is an oxygen sensor which includes cathode and anode electrodes. The sensor produces a current which, at a constant voltage, is directly proportional to the tension of oxygen at the active surface of the cathode. As there may be components in the fluid under analysis, such as ions which would be reduced simultaneously with the oxygen resulting in an increase in current or materials which contaminate the cathode, interfere with the reaction at the cathode, a membrane that is permeable to oxygen but blocks the transfer of other materials such as ions and contaminants is placed between the cathode and the material to be analyzed. Such an oxygen electrode is widely used in the measurement of oxygen in natural or sewage waters, ferments, and biochemical fluids such as blood. Another type of sensor used for blood analysis is the $PCO_2$ electrode which includes a combination pH electrode separated from the material to be analyzed by a membrane that is permeable to carbon dioxide but blocks the passage of ions.

It is essential that the means which separates the sensor electrodes from the material being analyzed be continuous. Typically the mechanical rigidity of membranes used for this purpose is rather limited and leaks frequently develop during operation. As a result, the data will be faulty or erratic but this failure is not immediately obvious to the operator. Prior techniques for monitoring the integrity of such a membrane include the imposition of an AC or DC voltage from an external source between the sensor and the measured solution. The imposed DC voltage is destructive of the sensor electrodes and therefore cannot be continuously presented. The AC technique employs a voltage of sufficiently low magnitude that the electrode system is not adversely effected by continuous monitoring. To avoid interference with the electrode system, the frequency of the AC voltage should be sufficiently high, preferably above 200 Hertz. This technique involves more complex electronic circuitry and the variable electrical capacity of the membrane may adversely influence the AC signal detection.

It is therefore an object of this invention to provide novel and improved monitoring apparatus for use in connection with electrochemical sensors.

Another object of the invention is to provide novel and improved instrumentation for monitoring the integrity of electrochemical sensors of the type that employ selectively permeable membranes.

Still another object of this invention is to provide novel and improved sensor integrity monitoring systems particularly adapted for use in instrumentation of the type for measuring partial pressures of oxygen or carbon dioxide.

Still another object of the invention is to provide novel and improved integrity monitoring systems for electrochemical instrumentation that is continuously operative and employs simple and inexpensive electronic circuitry without restricting the dynamic range of the sensor or imposing damage on the electrode system.

In accordance with the invention there is provided an electrochemical sensor system that includes a sensing half cell that includes a first electrode, a cooperating half cell that includes a second electrode, and a sample chamber for holding the material to be analyzed. At least one wall of the sample chamber is bounded by a selectively permeable member that separates the sensing half cell from the material in the sample chamber that is to be analyzed. A monitoring half cell includes a third electrode that has a surface exposed in the sample chamber, and a monitoring circuit is connected to one of the half cells on the opposite side of the selectively permeable member from the monitoring half cell for sensing current flow resulting from the potential difference (which preferably does not exceed 0.5 volt) between the monitoring and cooperating half cells and includes means for providing an output signal as a function of a predetermined value of that current flow.

In a particular embodiment, the invention is incorporated in electrochemical sensor instrumentation arranged to sense $PCO_2$ and $PO_2$ values of blood samples. The instrumentation includes separate sensor electrode assemblies for each of the parameters of interest, each assembly being isolated from the sample chamber by a selectively permeable membrane and being connected to separate DC circuitry for operating an output device to display an output indicative of the value of the particular sensed parameter. A common monitoring half cell includes a stainless steel electrode positioned with an end surface exposed in the sample chamber. A potential difference of approximately 0.15 volt exists between the silver/silver chloride electrode component of each sensor assembly and the stainless steel electrode. A satisfactory membrane has an electrical resistance of well over one megohm which resistance drops by a factor of more than 10 (below 100,000 ohms) if a leak occurs. This impedance is located between the monitoring and cooperating half cells and the monitoring circuitry is connected to monitor the current as a function of this impedance. In the particular embodiment the monitoring circuitry includes a high input impedance operational amplifier and its output controls the energization of a monitor lamp.

Apparatus constructed in accordance with the invention provides continuous and reliable detection of faults in electro-chemical sensor systems in an arrangement in which the monitoring circuitry is simple, inexpensive and relatively trouble free; and capacitive effects do not impair the monitoring accuracy of the detection.

Figure 2:
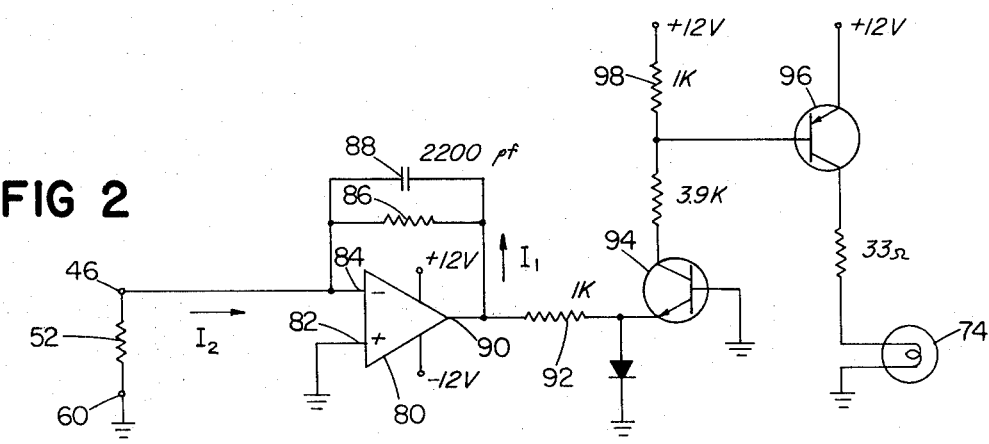

Other objects, features and advantages of the invention will be seen as the following description of a particular embodiment progresses in conjunction with the drawings, in which:

FIG. 1 is a block diagram of an electrochemical sensor system constructed in accordance with the invention; and FIG. 2 is a schematic diagram of portions of the monitor circuitry for the $PO_2$ sensor of the system shown in FIG. 1.

DESCRIPTION OF PARTICULAR EMBODIMENT

The system shown in FIG. 1 includes structure 10 defining a sample chamber having an inlet passage having port 12 and an outlet passage 14. Two electrode systems are positioned for insertion into contact with the fluid in chamber 10, a $PO_2$ electrode system 16 which extends into port 18 and a $PCO_2$ electrode system 20 which extends into port 22. A water jacket (not shown) surrounds the electrode systems and the sample chamber to maintain a constant temperature environment.

Electrode assembly 16 includes a platinum cathode 24 that extends through the end wall of glass envelope 26 so that only the tip of the cathode is exposed. A silver/silver chloride anode 28 sleeve is supported on envelope 26. Housing 30 has a polypropylene membrane 32 secured to it which extends over the end of the envelope 26. Electrolyte is stored in the chamber 34 surrounding anode 28 and is fed through a capillary passage to the tip of the envelope 26 so that a thin layer of electrolyte is disposed in contact with the cathode electrode 24. In operation, a constant polarizing voltage is applied to anode 28 and oxygen diffusing through membrane 32 is reduced at the cathode producing a current directly proportional to the oxygen tension. This current is sensed by circuitry 36 connected to cathode 24 and produces an output which is indicated by meter 38 to provide an indication of $PO_2$ in the sample in chamber 10.

The $PCO_2$ electrode includes a combination pH/reference electrode that includes a glass pH measuring half cell 40 of pH sensitive glass at the tip of the electrode assembly as the end of the inner chamber 42. A silver/silver chloride electrode 44 is disposed in a constant pH buffer electrolyte in chamber 42. A silver/silver chloride reference electrode 46 is disposed in outer chamber 48 in a $PCO_2$ electrolyte. The electrode assembly is disposed in housing 50 across the end of which is secured membrane 52 which is permeable to carbon dioxide so that the pH sensitive glass tip 40 is adjacent to membrane 52. Electrical contact between reference electrode 46 and measuring electrode 44 is made through the $PCO_2$ electrode via a port 54 in the wall of the outer reference electrode chamber 48. In operation, carbon dioxide diffuses across membrane 52, equilibrating the inner electrolyte with the external gas tension. Hydration of carbon dioxide in the electrolyte produces carbonic acid causing a change in hydrogen ion activity which is sensed by the electrode system. A voltage exponentially related to $PCO_2$ is developed for sensing by circuitry 56 which produces an output indication at meter 58.

Also supported in sample chamber 10 is a stainless steel electrode 60 that has its end surface 62 exposed to the material in the sample chamber for forming a half cell with that material. While electrode 60 may be of various materials, in this particular embodiment, stainless steel, an inexpensive, chemically resistant metal is employed. Electrode 60 is grounded and provides a reference with respect to oxygen sensor membrane monitoring circuit 64 and carbon dioxide membrane monitoring circuit 66. The output of each circuit is applied through amplifier circuit 68, 70 respectively for operating an indicator device which in preferred embodiment is a lamp 72, 74, respectively.

A schematic diagram of a preferred form of amplification and threshold circuit employed with the $PCO_2$ monitor system is shown in FIG. 2. That monitor circuitry includes an operational amplifier 80 which has its positive terminal 82 grounded (at the same potential as electrode 60) and its negative terminal 84 connected to reference electrode 46. The impedance of membrane 52 when intact is in excess of 1 megohm. In this condition, input current $I_1$ will be substantially zero, the output voltage at terminal 90 of the operational amplifier will be approximately the voltage generated by the two monitor and reference electrode half cells, approximately 150 millivolts, and the feedback current $I_2$ will be substantially zero. Thus the emitter base junction of transistor 94 will be back biased and that transistor will be maintained in a cutoff condition. Transistor 96 is also cut off and indicator lamp 74 is not energized. Should a fault occur, reducing the impedance of membrane 52, the input current $I_1$ will increase. A current as low as 0.1 microampere will produce an output voltage of $-2$ volts, the operational amplifier, for example, Analog Devices Type 124 having a minimum open loop gain of 10,000, acting like a threshold device in response to such a fault. As output 90 goes negative, this transition is coupled through resistor 92 to the emitter of transistor 94, thereby forward biasing the base emitter junction and turning that transistor on with a resulting current flow through resistor 98 and an accompanying voltage drop sufficient to cause transistor 96 to conduct and allowing current flow through lamp 74 to produce an indication of a defective membrane. The integrity monitoring circuit 64 for the $PO_2$ electrochemical sensor system is substantially the same as that for the $PCO_2$ system except that the positive terminal of the operational amplifier has a bias voltage applied to it which in turn is applied to the anode 28 of the $PO_2$ sensor.

It will thus be seen that the invention provides simple, reliable circuitry for continuously monitoring the integrity of a selectively permeable partition member in an electrochemical sensor electrode assembly. Other half cells may be employed. for example a Calomel half cell instead of a silver/silver chloride half cell. Similarly the monitoring electrode may be of another chemically resistant metal such as platinum. Therefore while a particular embodiment of the invention has been shown and described, it is recognized that various modifications thereof will be apparent to those skilled in the art. Thus, it is not intended that the invention be limited to the disclosed embodiment or to details thereof, and departures may be made therefrom within the spirit and scope of the invention.

What is claimed is:

1. An electrochemical sensor system comprising a sensing half cell including a first electrode, a cooperating half cell including a second electrode, a sample chamber for holding the material to be analyzed, at least one wall of the sample chamber being bounded by a selectively permeable member that separates said sensing half cell from the material in said sample chamber to be analyzed, a monitoring half cell including a third electrode that has a surface exposed in said sample chamber, and a monitoring circuit connected to one of said half cells on the opposite side of said selectively permeable member from said monitoring half cell for sensing current flow resulting from the difference between the half cell potentials of said monitoring and said one half cells, said monitoring circuit including means for providing an output signal as a function of a predetermined value of that current flow.

2. The system as claimed in claim 1 wherein said sample chamber is bounded by two selectively permeable membranes, each said membrane separating a corresponding sensing half cell from material in said sample chamber to be analyzed, and further including a second monitoring circuit connected to a half cell on the opposite side of the second selectively permeable membrane from said monitoring half cell, said second monitoring circuit sensing current flow resulting from the difference between the half cell potentials of said monitoring half cell and the half cell on the opposite side of said second selectively permeable membrane from said monitoring half cell.

3. The system as claimed in claim 1 wherein the difference between the half cell potentials of said monitoring half cell and said one half cell is less than 0.5 volt.

4. An electrochemical sensor system comprising a sensing half cell including a first electrode, a cooperating half cell including a second electrode, a sample chamber for holding the material to be analyzed, at least one wall of the sample chamber being bounded by a selectively permeable member that separates said sensing half cell from the material in said sample chamber to be analyzed, a monitoring half cell including a third electrode that has a surface exposed in said sample chamber, and a monitoring circuit connected to one of said half cells on the opposite side of said selectively permeable member from said monitoring half cell for sensing current flow resulting from the difference between the half cell potentials of said monitoring and said one half cells, said monitoring circuit comprising means for providing an output signal as a function of a predetermined value of that current flow and including an operational amplifier having a first input terminal connected to said monitoring half cell and a second input terminal connected to said one half cell.

5. An electrochemical sensor system comprising a sensing half cell including a first electrode, a cooperating half cell including a reference electrode, a sample chamber for holding the material to be analyzed, at least one wall of the sample chamber being bounded by a selectively permeable member that separates said sensing half cell from the material in said sample chamber to be analyzed, a monitoring half cell including a third electrode that is electrically connected to ground and has a surface exposed in said sample chamber, and a monitoring circuit connected to one of said half cells on the opposite side of said selectively permeable member from said monitoring half cell for sensing current flow resulting from the difference between the half cell potentials of said monitoring and said one half cells, said monitoring circuit including means for providing an output signal as a function of a predetermined value of that current flow.

6. An electrochemical sensor system comprising a sensing half cell including a first electrode, a cooperating half cell including an anode electrode, a sample chamber for holding the material to be analyzed, at least one wall of the sample chamber being bounded by a selectively permeable member that separates said sensing half cell from the material in said sample chamber to be analyzed, a monitoring half cell including a third electrode that is electrically connected to ground and has a surface exposed in said sample chamber, and a monitoring circuit connected to one of said half cells on the opposite side of said selectively permeable member from said monitoring half cell for sensing current flow resulting from the difference between the half cell potentials of said monitoring and said one half cells, said monitoring circuit including means for providing an output signal as a function of a predetermined value of that current flow.

7. The system as claimed in claim 1 wherein said monitoring circuit includes a threshold circuit responsive to the monitored current flow for providing an output signal fault indication only when said monitored current flow exceeds a predetermined value.

8. An electrochemical sensor system comprising a sensing half cell including a first electrode, a cooperating half cell including a second electrode, a sample chamber for holding the material to be analyzed, at least one wall of the sample chamber being bounded by a selectively permeable member that separates said sensing half cell from the material in said sample chamber to be analyzed, a monitoring half cell including a third electrode that has a surface exposed in said sample chamber, and a monitoring circuit connected to one of said half cells on the opposite side of said selectively permeable member from said monitoring half cell for sensing current flow resulting from the difference between the half cell potentials of said monitoring and said one half cells, said monitoring circuit comprising means for providing an output signal as a function of a predetermined value of that current flow and including an operational amplifier having a first input terminal connected to said monitoring half cell and a second input terminal connected to said one half cell and a threshold circuit responsive to the monitored current flow for providing an output signal fault indication only when said monitored current flow exceeds a predetermined value.

9. The system as claimed in claim 8 wherein said difference between the half cell potentials of said monitoring half cell and said one half cell is less than 0.5 volt.

10. An electrochemical sensor system comprising a first electrode assembly including a first sensing half cell including a first electrode, a first cooperating half cell including a second electrode assembly including a second sensing half cell that includes a third electrode and a second cooperating half cell that includes a fourth electrode, each said electrode assembly including a separate selectively permeable membrane and means for releasably connecting each said membrane to its corresponding electrode assembly in intimate contact with a surface thereof, a sample chamber for holding material to be analyzed, a first portion of said sample chamber being bounded by a first selectively permeable membrane that separates said first sensing half cell from the material in said sample chamber to be analyzed and a second portion of said sample chamber being bounded by a second selectively permeable membrane that separates said second sensing half cell from the material in said sample chamber to be analyzed, a first monitoring circuit including a first monitoring half cell, said first monitoring circuit being connected to one of the half cells of said first electrode assembly on the opposite side of said first selectively permeable membrane from said monitoring half cell for sensing current flow resulting from the difference between the half cell potentials of said monitoring and said one half cell of said first electrode assembly, and a second monitoring circuit including a second monitoring half cell, said second monitoring circuit being connected to a half cell of said second electrode assembly on the opposite side of the second selectively permeable membrane from said monitoring half cell for sensing current flow resulting from the difference between the half cell potentials of said monitoring half cell and said one half cell of said second electrode assembly, each said monitoring circuit including means for providing an output signal as a function of a predetermined value of that current flow.

11. Apparatus for monitoring the integrity of a selectively permeable membrane in an electrochemical sensor system, comprising a sensing half cell including a first electrode, a cooperating half cell including a second electrode, a sample chamber for holding the material to be analyzed, said sample chamber having a port in a wall thereof and said selectively permeable membrane being disposed across said port to separate said sensing half cell from the material in said sample chamber to be analyzed, a monitoring half cell including a third electrode that has a surface disposed in said sample chamber, said monitoring half cell generating an electric potential as a function of the material in which it is disposed, and a monitoring circuit connected to said cooperating half cell on the opposite side of said selectively permeable membrane from said monitoring half cell for sensing current flow resulting from the difference in the electric potential generated by said monitoring half cell and the galvanic potential generated by said cooperating half cell, said monitoring circuit including means for providing an output signal as a function of a pre-determined value of that current flow to provide an indication of the integrity of said selectively permeable membrane.

12. The apparatus as claimed in claim 11 wherein said sensing and cooperating half cells are disposed in an electrode assembly, said selectively permeable membrane is a separate member and further including means for releasably connecting said membrane to said electrode assembly in intimate contact with a surface thereof.

13. The apparatus as claimed in claim 12 wherein the potential difference between said electric potential and said galvanic potential is less than 0.5 volt.

14. The apparatus as claimed in claim 13 wherein said monitoring circuit includes an operational amplifier having a first input terminal connected to said monitoring half cell and a second input terminal connected to said one half cell.

15. The apparatus as claimed in claim 14 wherein said monitoring circuit includes a threshold circuit responsive to the monitored current flow for providing an output signal fault indication only when said monitored current flow exceeds a predetermined value.

16. The apparatus as claimed in claim 15 and further including a second electrode assembly including a sensing half cell including a fourth electrode, a cooperating half cell including a fifth electrode, a second selectively permeable membrane, and means for releasably attaching said second membrane to said second electrode assembly in intimate contact with a surface thereof and a second monitoring circuit connected to the cooperating half cell of said second electrode assembly on the opposite side of the second selectively permeable membrane from said monitoring half cell, said second monitoring circuit sensing current flow resulting from the potential difference between said monitoring half cell and the cooperating half cell of said second electrode assembly to which it is connected.

17. The apparatus as claimed in claim 16 wherein said first electrode is a platinum member, said second, fourth and fifth electrodes are silver/silver chloride members, and said third electrode is a stainless steel member.

* * * * *